United States Patent
Kamalavannan et al.

(10) Patent No.: US 8,402,213 B2
(45) Date of Patent: Mar. 19, 2013

(54) DATA REDUNDANCY USING TWO DISTRIBUTED MIRROR SETS

(75) Inventors: Hariharan Kamalavannan, Chennai (IN); Suresh Dhanarajan, Krishnagiri (IN); Senthil Kannan, Rediarpalayam (IN); Satish Subramanian, Chennai (IN); Selvaraj Rasappan, Coimbatore (IN)

(73) Assignee: LSI Corporation, San Jose, CA (US)

( * ) Notice: Subject to any disclaimer, the term of this patent is extended or adjusted under 35 U.S.C. 154(b) by 435 days.

(21) Appl. No.: 12/345,947

(22) Filed: Dec. 30, 2008

(65) Prior Publication Data

US 2010/0169571 A1    Jul. 1, 2010

(51) Int. Cl.
*G06F 12/00* (2006.01)
*G06F 3/06* (2006.01)
*G06F 13/00* (2006.01)
*G06F 13/28* (2006.01)
*G06F 9/26* (2006.01)
*G06F 9/34* (2006.01)

(52) U.S. Cl. ............. 711/114; 711/4; 711/112; 711/203

(58) Field of Classification Search ............... 711/4, 112, 711/114, 203, E12.001
See application file for complete search history.

(56) References Cited

U.S. PATENT DOCUMENTS

| | | | | |
|---|---|---|---|---|
| 5,764,903 | A * | 6/1998 | Yu | 709/208 |
| 6,332,177 | B1 * | 12/2001 | Humlicek | 711/114 |
| 2006/0085674 | A1 * | 4/2006 | Ananthamurthy | 714/6 |
| 2007/0083709 | A1 * | 4/2007 | Hajji | 711/114 |

* cited by examiner

*Primary Examiner* — Michael Alsip
(74) *Attorney, Agent, or Firm* — Samuel M. Freund; Christopher P. Whitham; Cochran Freund & Young LLC

(57) ABSTRACT

A method for storing data and two sets of distributed mirrored data disposed as data stripes which permits data recovery without the necessity of parity calculations, is described. Redundant data are stored in groups of five physical hard drives which are logically segmented into stripe groups, each stripe group having three data stripe sets wherein one data stripe is protected by two distributed mirror stripes in accordance with an algorithm. The present method provides protection for all one- and two-disk failures and certain three-disk drive failures, for each physical five disk group, and retains a usable disk capacity of 33%.

8 Claims, 2 Drawing Sheets

DATA REDUNDANCY USING TWO DISTRIBUTED MIRROR SETS

FIELD OF THE INVENTION

The present invention relates generally to data recovery from failure of one or more disks in an array of disk drives used for information storage and, more particularly to a method for achieving data redundancy using two distributed mirror sets without requiring the use of parity.

BACKGROUND OF THE INVENTION

Redundant Array of Independent Disks (RAID) combines multiple inexpensive disk drives into an array of disk drives to obtain performance, capacity and reliability exceeding that of a single large drive, while appearing to a host computer like a single logical drive. The mean time between failures in an array is equal to the failure rate of an individual drive divided by the number of drives in the array. Therefore, the failure rate of a non-redundant array is too high for mission-critical systems. Six RAID array levels, RAID 1 through RAID 6, are currently in use, each providing disk-fault tolerance and having different compromises in features and performance, with a sixth non-redundant array architecture being referred to as a RAID 0 array.

Fundamental to RAID technology is striping which partitions the storage space of each drive into stripes interleaved in a rotating sequence such that the combined space is composed alternately of stripes from each drive, wherein multiple drives are combined into a single logical storage unit. Stripes may be as small as one sector (512 bytes) or as large as several megabytes, stripe size being determined by a specific type of operating environment. Although concurrent disk input/output operations across multiple drives are supported by most operating systems, in order to maximize throughput for a disk subsystem, if the input/output load is balanced across all drives, each drive may be maintained as active as possible, which requires striping. By striping the drives in an array with stripes sufficiently large such that each record falls within one stripe, most records can be evenly distributed across all drives which keeps the drives busy during heavy load situations by permitting all drives to work concurrently on different input/output operations, thereby maximizing the number of simultaneous input/output operations that can be performed by the array.

With the exceptions of RAID levels 0 and 1, the other RAID levels use parity logic to provide data protection in the event of disk failures. Calculation of parity for XOR logic use during data write operations and for data reconstruction during recovery operations, takes more time and resources, thereby degrading system performance. There is also the possibility of additional disk failures during parity reconstruction (especially when there are terabytes of data involved) which may result in loss of data. RAID 0 provides performance but not redundancy, while RAID 1 provides performance and redundancy, but allocates 50% of the disk capacity and cannot support random multi-disk failures. RAID 3 and RAID 5 have poorer performance when compared to RAID 0 and 1, and do not handle multi-disk failures well; however more of the disk capacity is available. RAID 6 provides for multi-disk random failures of up to two physical disks, but the performance is greatly degraded due to the requirement of double parity generation. It should be mentioned that there is a significant probability of greater than two disk failures in situations where greater than terabyte volumes of information are reconstructed; that is, where data growth has reached the level of 1 TB on a single HDD, thereby generating greater likelihood of high disk failure rates during data reconstructions.

SUMMARY OF THE INVENTION

Accordingly, it is an object of the present invention to provide a method for data storage which permits data recovery from at least one failed disk drive in an array of disk drives.

Another object of the invention is to provide a method for data storage which permits data recovery from at least one failed disk drive in an array of disk drives without using parity calculations.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects, and in accordance with the purposes of the present invention, as embodied and broadly described herein, the method for storing data hereof, includes: dividing a first selected block of data to be stored into five data stripes, D1, D2, D3, D4, and D5; generating first mirror data stripes M1, M2, M3, M4, and M5, wherein M1 is a mirror stripe of D1, M2 is a mirror stripe of D2, M3 is a mirror stripe of D3, M4 is a mirror stripe of D4, and M5 is a mirror stripe of D5; generating second mirror data stripes M1', M2', M3', M4', and M5', wherein M1' is a mirror stripe of D1, M2' is a mirror strip of D2, M3' is a mirror stripe of D3, M4' is a mirror stripe of D4, and M5' is a mirror stripe of D5; providing a first set of five data storage units, S1, S2, S3, S4, and S5; writing D1, M3 and M4' onto S1; writing D2, M4 and M5' on S2; writing D3, M5 and M1' on S3; writing D4, M1 and M2' on S4; and writing D5, M2 and M3' on S5.

In another aspect of the invention and in accordance with its objects and purposes, the method for storing data, hereof, further includes the steps of: dividing a second selected block of data to be stored into five data stripes, $D_2 1, D_2 2, D_2 3, D_2 4$, and $D_2 5$; generating first mirror data stripes $M_2 1, M_2 2, M_2 3, M_2 4$, and $M_2 5$, wherein $M_2 1$ is a mirror stripe of $D_2 1, M_2 2$ is a mirror stripe of $D_2 2, M_2 3$ is a mirror stripe of $D_2 3, M_2 4$ is a mirror stripe of $D_2 4$, and $M_2 5$ is a mirror stripe of $D_2 5$; generating second mirror data stripes $M_2 1', M_2 2', M_2 3', M_2 4'$, and $M_2 5'$, wherein $M_2 1'$ is a mirror stripe of $D_2 1, M_2 2'$ is a mirror stripe of $D_2 2, M_2 3'$ is a mirror stripe of $D_2 3, M_2 4'$ is a mirror stripe of $D_2 4$, and $M_2 5'$ is a mirror stripe of $D_2 5$; providing a second set of five data storage units, $S_2 1, S_2 2, S_2 3, S_2 4$, and $S_2 5$; writing $D_2 1, M_2 3$ and $M_2 4'$ onto $S_2 1$; writing $D_2 2, M_2 4$ and $M_2 5'$ on $S_2 2$; writing $D_2 3, M_2 5$ and $M_2 1'$ on $S_2 3$; writing $D_2 4, M_2 1$ and $M_2 2'$ on $S_2 4$; writing $D_2 5, M_2 2$ and $M_2 3'$ on $S_2 5$; whereby D1, D2, D3, D4, D5, $D_2 1, D_2 2, D_2 3, D_2 4$, and $D_2 5$ can be read in parallel.

Benefits and advantages of the present method for data storage include, but are not limited to, a read performance equal to a RAID 0 system; a redundancy level greater than or equal to a RAID 6 system (where certain combinations of three disk failures in a five disk set are recoverable); a data recovery mode better than the reconstruction mode for RAID levels 3, 4, 5, and 6 procedures; and the possibility of spanning and online expansion.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION OF THE INVENTION

Briefly, the present invention includes a method for data storage using two sets of distributed mirrored data which permits data recovery without requiring parity calculations. An embodiment of the invention increases the redundancy level by storing data in a disk group, illustrated as a set of five hard drives, as an example, each of which is logically segmented into Stripe Groups (SG). Each SG has three stripe sets (one data stripe protected by two distributed mirror sets). The present method provides protection for one, two and certain three disk failures for every five disk group. The physical drives in the storage array are grouped in sets of five and multiple disk groups are projected as a single volume group to the storage array controller. Disk scalability may be provided in increments of five physical data disks.

Figure 1:
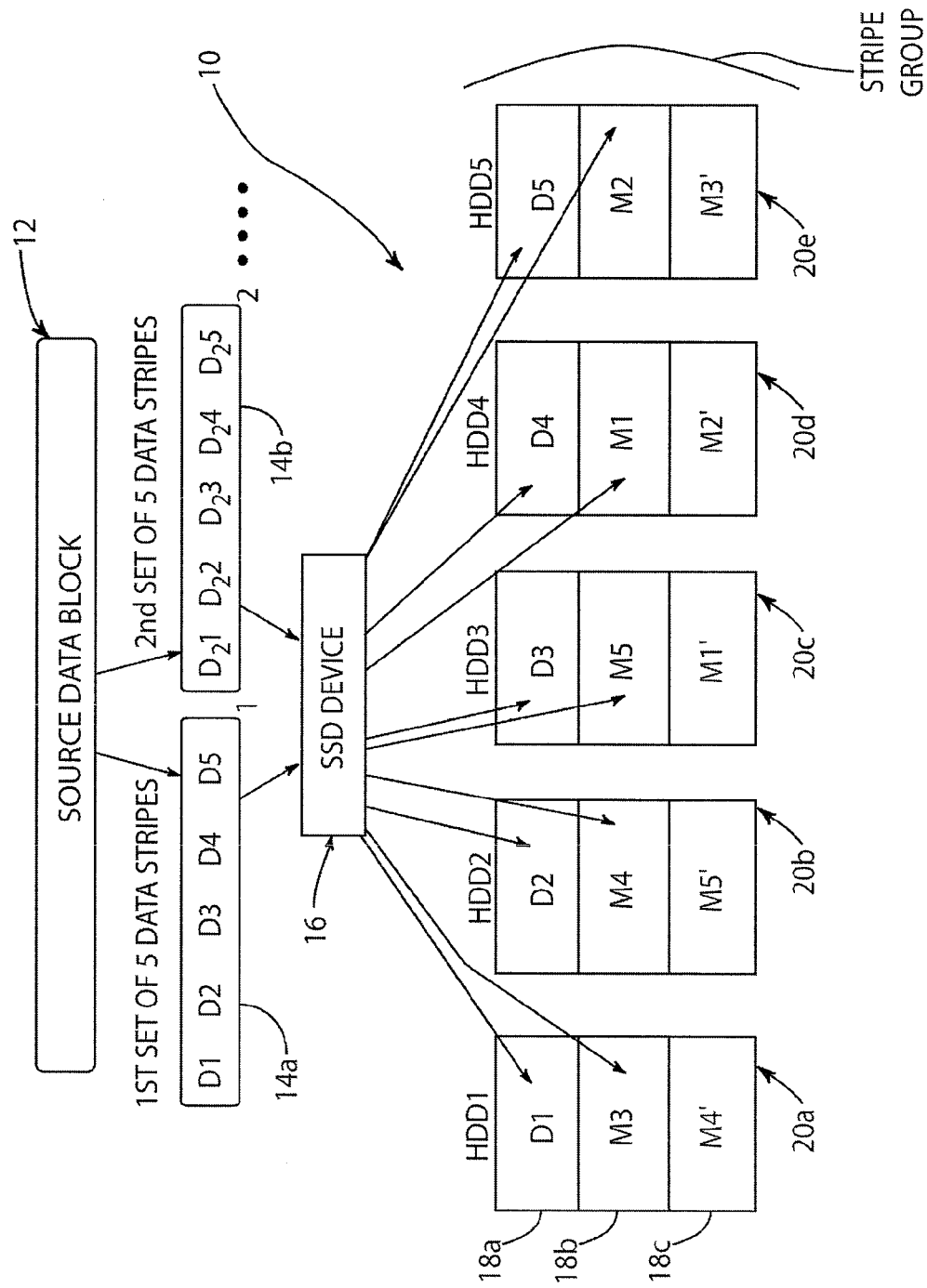
FIG. 1 is a schematic representation of an embodiment of an apparatus effective for storing data in accordance with the teachings of the present invention, illustrating a data source for separating data into sets of 5 data stripes each and a solid-state drive device for partitioning the stripes into data stripe groups of three stripes each on each of five disk drives, wherein one stripe on each hard disk drive includes one of the five data stripes from one set of five data stripes, and specific combinations of first and second mirrored stripes from each of the five data stripes from one set of five data stripes on second and third stripes on each disk.

Reference will now be made in detail to the present embodiments of the present invention, examples of which are illustrated in the accompanying drawings. Similar or identical structure is identified using identical reference characters. Turning now to the FIGURES, FIG. 1 is a schematic representation of an embodiment of apparatus, 10, effective for storing data in accordance with the teachings of the present invention. Controller, 12, separates data into N sets, shown for N=2 as 14a, and 14b, having five data stripes each (D1, D2, D3, D4, and D5; and $D_2 1$, $D_2 2$, $D_2 3$, $D_2 4$, and $D_2 5$), and writes them into a cache device such as solid-state drive (SSD) device, 16, which partitions stripes D1-D5 into data stripe groups having three stripes each, 18a-18c, on each of five hard disk drives, 20a-20e. One data stripe on each hard disk drive includes one of the five data stripes from the one set of five data stripes, and specific combinations of first and second mirrored data stripes from each of the five data stripes from one set of five data stripes on second and third stripes on each disk. Although disk drives 20a-20e are shown as hard disk drives, any data storage medium may be used. Similarly, one having ordinary skill in the art would be able to choose appropriate SSD and other components to suit the particular requirements of the data storage system after having reviewed the present disclosure.

Figure 2:
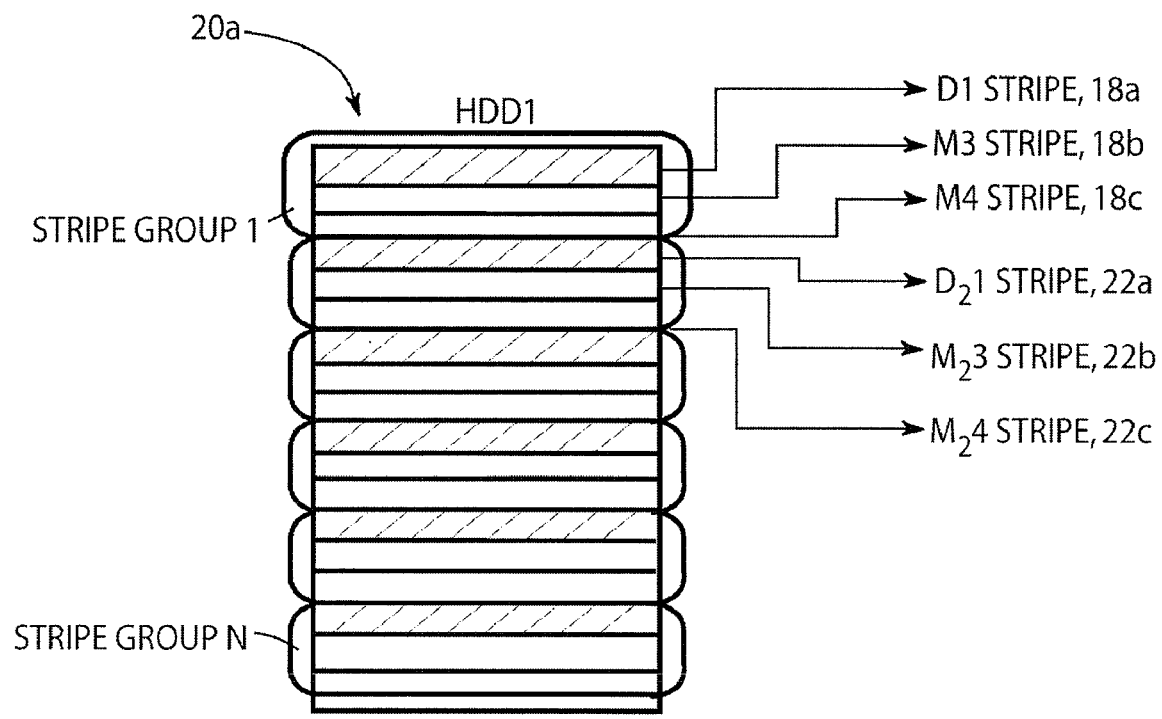
FIG. 2 is a schematic representation of one hard drive illustrating N stripe groups each containing three stripes, the first stripe group being shown in FIG. 1 hereof, wherein the first stripe includes data D1, the second is first mirrored stripe M3 and the third is the second mirrored stripe M4'.

FIG. 2 is a schematic representation of hard disk drive 20a illustrating N stripe groups 18a-18c each containing three data stripes, the first stripe group being shown on drive 20a in FIG. 1 hereof, wherein the first stripe includes data D1, the second is first mirrored set M3 and the third is the second mirrored set M4'. As an example, stripe group 2 on HDD1 (20a) may contain the stripes $D_2 1$, $M_2 3$ and $M_2 4'$, 22a-22c.

Additional sets of five disk drives may be added to increase storage space. A resynchronization may be performed to span the data across multiple drive sets in order to maximize parallel data reading. For example, if there are only five disks available, D1 to D5 and their mirrored data stripes would be placed in sets of three first data stripe groups, while $D_2 1$-$D_2 5$ and their mirrored data stripes would be placed in sets of three, second data stripe groups on the same five disks, thereby preventing D1-$D_2 5$ from being read in parallel. By contrast, if an additional five hard disk drives are available, the data stripes may be rearranged such that D1-D5 and their mirrored data stripes may reside in sets of three data stripes on the first group of drives, while $D_2 1$-$D_2 5$ and their mirrored data stripes reside in sets of three data stripes on the additional five drives, and D1-D5 and $D_2 1$-$D_2 5$, may be read simultaneously.

In accordance with an embodiment of the method of the present invention, a "disk group" is segmented into "stripe groups" as shown in FIG. 1, hereof, each data stripe group having three strip sets or layers. The first stripe set may be the chosen data stripe set and may be synchronously written to the selected drive, while the other two data stripe sets may be distributed mirror data of the first data stripe set and may be asynchronously written to the same drive.

A. I/O Write:

Assuming for purposes of explanation that there are 10 physical disks; in accordance with an embodiment of the present invention, the disks may be grouped into two groups of disks. Each disk in a group is segmented into a chosen number 'N' of "stripe groups" during disk initialization. Each data stripe group consists of a set of three data stripes with one data stripe in the first layer followed by two mirror data stripe sets containing selected stripes in the second and third layers. A controller partitions the data blocks into data stripes each having a chosen size. The stripes are separated into sets of five data stripes; that is, for 10 storage disks, there will be two sets D1, D2, D3, D4, and D5, and $D_2 1$, $D_2 2$, $D_2 3$, $D_2 4$, and $D_2 5$. D1, D2, D3, D4, D5 and $D_2 1$, $D_2 2$, $D_2 3$, $D_2 4$, and $D_2 5$ are written to a cache device such as a SSD (Solid State Disk) drive and then to the physical drives. The controller requests another set of data stripes. The mirrored data stripe set for layer 2 and layer 3 in the first stripe group may be written asynchronously. The pattern for writing the mirrored set is predefined as mentioned hereinabove. The same pattern is applicable for all stripe groups. The controller maintains the pattern for writing the mirror stripes to the stripe groups and the stripe group mappings. Once the mirror set for "strip group" 1 is written, the corresponding mirror sets for $D_2 1$, $D_2 2$, $D_2 3$, $D_2 4$, and $D_2 5$, etc. in the SSD are generated and written on the disks.

B. I/O Read:

For retrieving D1 and $D_2 1$, as an example (in this situation, $D_2 1$ is written in the same disk as is D1), D1 may be read first and then $D_2 1$. The controller checks the disks where no IO writing is happening to determine whether D1 and $D_2 1$ have corresponding mirror set data. Although other algorithms may be employed, the least accessed path algorithm may be used for retrieving the data from a particular strip set, thereby increasing system performance as both write and read may occur in parallel. In such situations, the reading process may either retrieve data from the original data stripe D1, or one of its mirror data stripes, M1, or M1' in the event that the HDD on which D1 resides is serving another I/O requirement, thereby increasing system performance and avoiding the I/O waiting in line.

C. Data Recovery:

Each disk group striped as illustrated in FIG. 1 hereof may survive (that is, the data can be fully recovered) any combination of two-disk failures, as shown in TABLE 1.

TABLE 1

| HDD1 | HDD2 | HDD3 | HDD4 | HDD5 |
|------|------|------|------|------|
| X | X | ✓ | ✓ | ✓ |
| X | ✓ | X | ✓ | ✓ |
| X | ✓ | ✓ | X | ✓ |
| X | ✓ | ✓ | ✓ | X |
| ✓ | X | X | ✓ | ✓ |
| ✓ | X | ✓ | X | ✓ |
| ✓ | X | ✓ | ✓ | X |
| ✓ | ✓ | X | X | ✓ |
| ✓ | ✓ | X | ✓ | X |
| ✓ | ✓ | ✓ | X | X |

X = Indicates failed drive location
✓ = Indicates Working drive location

Clearly, each disk group will be able to be reconstructed with a single disk failure.

Further, each disk group may handle certain combinations of three-disk failures. TABLE 2 illustrates one scenario for the failure of three disks in a five disk group.

TABLE 2

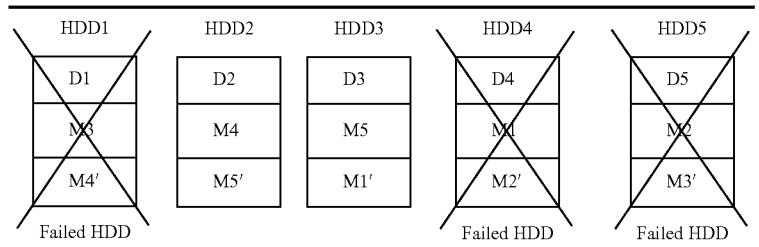

X = Indicates failed drive location
✓ = Indicates Working drive location

It may be observed from TABLE 2 that if HDD1, HDD4, and HDD5 all fail, the data for the disk group may be recovered from the remaining data on HDD2 and HDD3. For example, D1 is recovered from the mirrored M1' (from HDD2), D4 is recovered from the mirrored M4 (from HDD2), D5 is recovered from either mirrored M5 (from HDD3) or M5' (from HDD2) based on the least accessed path algorithm, as explained hereinabove.

All HDD data and mirror patterns are pre-defined in the controller, and the controller takes charge of copying the data from the active HDDs to the newly replaced HDDs. This copying of data may be achieved based on the least used active HDD. The pre-defined stripe patterns assist the controller in identifying where the redundant data is stored and what data is missing. During data recovery in the newly replaced drives, the drives are initialized as stripe groups and the data layer may be recovered first. The two sets of respective mirrored layers in the stripe group may be recovered after the entire data layer is recovered for all of the stripe groups.

TABLE 3 sets forth all of the three-disk failures in the five-disk group for which the present method can recover all of the data.

TABLE 3

| HDD1 | HDD2 | HDD3 | HDD4 | HDD5 |
|------|------|------|------|------|
| X | X | X | ✓ | ✓ |
| X | X | ✓ | ✓ | X |

TABLE 3-continued

| HDD1 | HDD2 | HDD3 | HDD4 | HDD5 |
|------|------|------|------|------|
| ✓ | X | X | X | ✓ |
| ✓ | ✓ | X | X | X |
| X | ✓ | ✓ | X | X |

X = Indicates failed drive location
✓ = Indicates Working drive location

TABLE 4 sets forth the three-disk failures in a five disk group for which all of the data cannot be recovered. These combinations are rare, however.

TABLE 4

| HDD1 | HDD2 | HDD3 | HDD4 | HDD5 |
|------|------|------|------|------|
| X | X | ✓ | X | ✓ |
| ✓ | X | X | ✓ | X |
| X | ✓ | X | X | ✓ |
| ✓ | X | ✓ | X | X |
| X | ✓ | X | ✓ | X |

X = Indicates failed drive location
✓ = Indicates Working drive location

The present invention then includes multiple physical disks grouped into sets of five disks each which can be combined into a Volume group, and wherein each disk group is segmented into data stripe groups, each data stripe group having one data stripe and two mirror copies of the data stripe. Mirror stripes are distributed as illustrated in FIG. 1 hereof. As also shown hereinabove, each data can be completely recovered from each disk group in the event of any combination of two-disk failures, while each disk group can survive 50% of the possible combinations of three-disk failures. In accordance with the present invention, an I/O reading procedure may also include reading M1 from the disk drive on which it is stored (HDD4 in FIG. 1 hereof) if D1 cannot be read from the drive in which it is stored because the drive is busy (HDD1 in FIG. 1 hereof), or M1' (HDD3 in FIG. 1 hereof).

Read performance of the present invention is equal to that of a RAID 0 system, while the redundancy level is equal to or surpasses that of a RAID 6 system in combinations with three-disk failures for every five disk group. That is, every disk group of five disks can have three disk failures as shown in TABLES 2 and 3, hereinabove. The data recovery mode hereof is better than the reconstruction mode for RAID levels 3, 4, 5, and 6 since the RAID engine need not invest its processing power for generating parity bits by reading all of the data bits, and again writing the parity bits in the disks, and spanning and online expansion is possible.

The usable disk capacity of the present method would be 33%, as compared with 50% for a RAID 1 system. However, this limitation for huge disk capacity (1 TB drives are available) in a single drive for the same cost is not a serious limitation when redundancy and performance are considered. As stated hereinabove, 50% of three-disk failure combinations cannot be recovered.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for storing data comprising:
dividing a first selected block of data to be stored into five data stripes, D1, D2, D3, D4, and D5;
generating first mirror data stripes M1, M2, M3, M4, and M5, wherein M1 is a mirror stripe of D1, M2 is a mirror stripe of D2, M3 is a mirror stripe of D3, M4 is a mirror stripe of D4, and M5 is a mirror stripe of D5;
generating second mirror data stripes M1', M2', M3', M4', and M5', wherein M1' is a mirror stripe of D1, M2' is a mirror stripe of D2, M3' is a mirror stripe of D3, M4' is a mirror stripe of D4, and M5' is a mirror stripe of D5;
providing a first set of five data storage units, S1, S2, S3, S4, and S5;
writing D1, M3 and M4' onto S1 such that D1 is written to a first layer of S1, M3 is written to a second layer of S1, and M4' is written to a third layer of S1;
writing D2, M4 and M5' on S2 such that D2 is written to a first layer of S2, M4 is written to a second layer of S2, and M5' is written to a third layer of S2;
writing D3, M5 and M1' on S3 such that D3 is written to a first layer of S3, M5 is written to a second layer of S3, and M1' is written to a third layer of S3;
writing D4, M1 and M2' on S4 such that D4 is written to a first layer of S4, M1 is written to a second layer of S4, and M2' is written to a third layer of S4; and
writing D5, M2 and M3' on S5 such that D5 is written to a first layer of S5, M2 is written to a second layer of S5, and M3' is written to a third layer of S5,
wherein data stripes D1, D2, D3, D4, and D5 are synchronously written onto storage units S1, S2, S3, S4, and S5, respectively, wherein data stripes M3, M4, M5, M1, and M2 are asynchronously written onto storage units S1, S2, S3, S4, and S5, respectively, wherein data stripes M4', M5', M1', M2', and M3' are asynchronously written onto storage units 51, S2, S3, S4, and S5, respectively, wherein data stripes D1, D2, D3, D4, and D5, M3, M4, M5, M1, and M2, and M4', M5', M1', M2', and M3', are located using a sequentially-based indexing table, and wherein each of said first, second, and third layers in total for storage units S1, S2, S3, S4 and S5 effectively contain a full copy of said first selected block of data such that a single write operation to said first, second, or third layer of said storage units S1, S2, S3, S4 and S5 effectively writes said full copy of said first selected block of data in parallel to said storage units S1, S2, S3, S4 and S5 for said selected first, second, or third layer of said storage units S1, S2, S3, S4 and S5.

2. The method of claim 1, wherein storage units S1, S2, S3, S4, and S5 each comprise a hard disk drive.

3. The method of claim 1, further comprising the steps of reading M1' from S3 or reading M1 from S4 if S1 is busy, in order to obtain the information in data stripe D1; reading M2' from S4 or reading M2 from S5 if S2 is busy, in order to obtain the information in data stripe D2; reading M3 from S1 or reading M3' from S5 if S3 is busy, in order to obtain the information in data stripe D3; reading M4' from S1 or reading M4 from S2 if S4 is busy, in order to obtain the information in data stripe D4; and reading M5' from S2 or reading M5 from S3 if S5 is busy, in order to obtain the information in data stripe D5.

4. The method of claim 1, further comprising the steps of reading M1' from S3 or reading M1 from S4 if S1 fails, in order to recover the information in data stripe D1; reading M2' from S4 or reading M2 from S5 if S2 fails, in order to recover the information in data stripe D2; reading M3 from S1 or reading M3' from S5 if S3 fails, in order to recover the information in data stripe D3; reading M4' from S1 or reading M4 from S2 if S4 fails, in order to recover the information in data stripe D4; and reading M5' from S2 or reading M5 from S3 if S5 fails, in order to recover the information in data stripe D5.

5. The method of claim 1, further comprising the steps of:
dividing a second selected block of data to be stored into five data stripes, $D_2 1$, $D_2 2$, $D_2 3$, $D_2 4$, and $D_2 5$;
generating first mirror data stripes $M_2 1$, $M_2 2$, $M_2 3$, $M_2 4$, and $M_2 5$, wherein $M_2 1$ is a mirror stripe of $D_2 1$, $M_2 2$ is a mirror stripe of $D_2 2$, $M_2 3$ is a mirror stripe of $D_2 3$, $M_2 4$ is a mirror stripe of $D_2 4$, and $M_2 5$ is a mirror stripe of $D_2 5$;
generating second mirror data stripes $M_2 1'$, $M_2 2'$, $M_2 3'$, $M_2 4'$, and $M_2 5'$, wherein $M_2 1'$ is a mirror stripe of $D_2 1$, $M_2 2'$ is a mirror stripe of $D_2 2$, $M_2 3'$ is a mirror stripe of $D_2 3$, $M_2 4'$ is a mirror stripe of $D_2 4$, and $M_2 5'$ is a mirror stripe of $D_2 5$;
providing a second set of five data storage units, $S_2 1$, $S_2 2$, $S_2 3$, $S_2 4$, and $S_2 5$;
writing $D_2 1$, $M_2 3$ and $M_2 4'$ onto $S_2 1$ such that $D_2 1$ is written to a first layer of $S_2 1$, $M_2 3$ is written to a second layer of $S_2 1$, and $M_2 4'$ is written to a third layer of $S_2 1$;
writing $D_2 2$, $M_2 4$ and $M_2 5'$ on $S_2 2$ such that $D_2 2$ is written to a first layer of $S_2 2$ $M_2 4$ is written to a second layer of $S_2 2$, and $M_2 5'$ is written to a third layer of $S_2 2$;
writing $D_2 3$, $M_2 5$ and $M_2 1'$ on $S_2 3$ such that $D_2 3$ is written to a first layer of $S_2 3$ $M_2 5$ is written to a second layer of $S_2 3$, and $M_2 1'$ is written to a third layer of $S_2 3$;
writing $D_2 4$, $M_2 1$ and $M_2 2'$ on $S_2 4$ such that $D_2 4$ is written to a first layer of $S_2 4$ $M_2 1$ is written to a second layer of $S_2 4$, and $M_2 2'$ is written to a third layer of $S_2 4$;
writing $D_2 5$, $M_2 2$ and $M_2 3'$ on $S_2 5$ such that $D_2 5$ is written to a first layer of $S_2 5$ $M_2 2$ is written to a second layer of $S_2 5$, and $M_2 3'$ is written to a third layer of $S_2 5$;
wherein data stripes $D_2 1$, $D_2 2$, $D_2 3$, $D_2 4$, and $D_2 5$ are synchronously written onto storage units $S_2 1$, $S_2 2$, $S_2 3$, $S_2 4$, and $S_2 5$, respectively, wherein data stripes $M_2 3$, $M_2 4$ $M_2 5$, $M_2 1$, and $M_2 2$ are asynchronously written onto storage units $S_2 1$, $S_2 2$, $S_2 3$, $S_2 4$ and $S_2 5$, respectively, wherein data stripes $M_2 4'$, $M_2 5'$, $M_2 1'$, $M_2 2'$, and $M_2 3'$ are asynchronously written onto storage units $S_2 1$, $S_2 2$, $S_2 3$, $S_2 4$, and $S_2 5$, respectively, wherein data stripes $D_2 1$, $D_2 2$, $D_2 3$, $D_2 4$, and $D_2 5$, $M_2 3$, $M_2 4$, $M_2 5$, $M_2 1$, and $M_2 2$ and $M_2 4'$, $M_2 5'$, $M_2 1'$, $M_2 2'$, and $M_2 3'$, are located using a sequentially-based indexing table, and wherein each of said first, second, and third layers in total for storage units $S_2 1$, $S_2 2$, $S_2 3$, $S_2 4$ and $S_2 5$ effectively contain a full copy of said second selected block of data such that a single write operation to said first, second, or third layer of said storage units $S_21$ $S_22$, $S_23$, $S_24$ and $S_25$ effectively writes said full copy of said second selected block of data in parallel to said storage units $S_21$, $S_22$, $S_23$, $S_24$ and $S_25$ for said selected first, second, or third layer of said storage units $S_21$, $S_22$, $S_23$, $S_24$ and $S_25$; and whereby D1, D2, D3, D4, D5, $D_21$, $D_22$, $D_23$, $D_24$, and $D_25$ can be read in parallel.

6. The method of claim 5, wherein storage units $S_21$, $S_22$, $S_23$, $S_24$, and $S_25$ each comprise a hard disk drive.

7. The method of claim 5, further comprising the steps of reading $M_21'$ from $S_23$ or reading $M_21$ from $S_24$ if $S_21$ is busy, in order to obtain the information in data stripe $D_21$; reading $M_22'$ from $S_24$ or reading $M_22$ from $S_25$ if $S_22$ is busy, in order to obtain the information in data stripe $D_22$; reading $M_23$ from $S_21$ or reading $M_23'$ from $S_25$ if $S_23$ is busy, in order to obtain the information in data stripe $D_23$; reading $M_24'$ from $S_21$ or reading $M_24$ from $S_22$ if $S_24$ is busy, in order to obtain the information in data stripe $D_24$; and reading $M_25'$ from $S_22$ or reading $M_25$ from $S_23$ if $S_25$ is busy, in order to obtain the information in data stripe $D_25$.

8. The method of claim 5, further comprising the steps of reading $M_21'$ from $S_23$ or reading $M_21$ from $S_24$ if $S_21$ fails, in order to recover the information in data stripe $D_21$; reading $M_22'$ from $S_24$ or reading $M_22$ from $S_25$ if $S_22$ fails, in order to recover the information in data stripe $D_22$; reading $M_23$ from $S_21$ or reading $M_23'$ from $S_25$ if $S_23$ fails, in order to recover the information in data stripe $D_23$; reading $M_24'$ from $S_21$ or reading $M_24$ from $S_22$ if $S_24$ fails, in order to recover the information in data stripe $D_24$; and reading $M_25'$ from $S_22$ or reading $M_25$ from $S_33$ if $S_25$ fails, in order to recover the information in data stripe $D_25$.

* * * * *